(12) United States Patent
Wengler et al.

(10) Patent No.: US 7,702,338 B2
(45) Date of Patent: Apr. 20, 2010

(54) METHOD FOR FINDING THE LOCATION OF A MOBILE TERMINAL IN A CELLULAR RADIO SYSTEM

(75) Inventors: Michael Wengler, Carlsbad, CA (US); Wyatt T. Riley, King of Prussia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 10/954,847

(22) Filed: Sep. 29, 2004

(65) Prior Publication Data

US 2006/0068809 A1  Mar. 30, 2006

(51) Int. Cl.
*H04W 24/00* (2009.01)
(52) U.S. Cl. .............. 455/456.1; 455/67.11; 455/423; 342/357.06
(58) Field of Classification Search ...... 455/456.1–457, 455/6, 41.2, 423, 67.11; 342/357.01, 357.06; 701/212, 207, 213
See application file for complete search history.

(56) References Cited

U.S. PATENT DOCUMENTS

| | | | | |
|---|---|---|---|---|
| 5,394,158 A | * | 2/1995 | Chia | 342/457 |
| 5,646,857 A | * | 7/1997 | McBurney et al. | 701/213 |
| 5,717,406 A | * | 2/1998 | Sanderford et al. | 342/457 |
| 5,731,786 A | * | 3/1998 | Abraham et al. | 342/357.08 |
| 5,812,086 A | * | 9/1998 | Bertiger et al. | 342/357.06 |
| 5,890,068 A | * | 3/1999 | Fattouche et al. | 455/456.2 |
| 5,949,816 A | * | 9/1999 | Okamoto | 375/150 |
| 5,977,913 A | * | 11/1999 | Christ | 342/465 |
| 5,982,757 A | * | 11/1999 | Curtis et al. | 370/328 |
| 6,006,097 A | * | 12/1999 | Hornfeldt et al. | 455/456.2 |
| 6,108,556 A | * | 8/2000 | Ito | 455/456.2 |
| 6,198,935 B1 | * | 3/2001 | Saha et al. | 455/456.2 |
| 6,243,648 B1 | * | 6/2001 | Kilfeather et al. | 701/213 |
| 6,246,884 B1 | * | 6/2001 | Karmi et al. | 455/521 |
| 6,252,543 B1 | * | 6/2001 | Camp | 342/357.06 |
| 6,317,603 B1 | * | 11/2001 | Allison | 455/456.1 |
| 6,330,454 B1 | * | 12/2001 | Verdonk | 455/456.2 |
| 6,430,415 B1 | * | 8/2002 | Agashe et al. | 455/456.5 |
| 6,515,618 B1 | * | 2/2003 | Lupash | 342/357.02 |
| 6,549,545 B1 | * | 4/2003 | Yamamoto et al. | 370/508 |
| 6,556,943 B2 | * | 4/2003 | Kuwahara et al. | 702/150 |

(Continued)

FOREIGN PATENT DOCUMENTS

JP  02186012  6/2002

(Continued)

OTHER PUBLICATIONS

Nagpal, et al., "Organizing a Global Coordinate System from Local Information on an Ad Hoc Sensor Network," In the 2nd International Workshop on Information Processing in Sensor Networks (IPSN'03), Palo Alto, Apr. 2003.

(Continued)

*Primary Examiner*—Sharad Rampuria
(74) *Attorney, Agent, or Firm*—Linda G. Gunderson

(57) ABSTRACT

A system, method and device are provided which determine the position of a mobile station in connection with consulting signal delay transmission data from an almanac for the purpose of identifying the nearest set of base stations. Thereafter, the position of the mobile station is determined using multilateration.

22 Claims, 5 Drawing Sheets

U.S. PATENT DOCUMENTS

| | | | | |
|---|---|---|---|---|
| 6,597,916 | B2* | 7/2003 | Edge | 455/456.1 |
| 6,728,545 | B1* | 4/2004 | Belcea | 455/456.2 |
| 6,775,252 | B1* | 8/2004 | Bayley | 370/328 |
| 6,799,047 | B1* | 9/2004 | Bahl et al. | 455/456.1 |
| 6,853,848 | B2* | 2/2005 | Sahinoglu | 455/456.1 |
| 6,901,264 | B2* | 5/2005 | Myr | 455/456.5 |
| 6,950,661 | B2* | 9/2005 | Watanabe et al. | 455/456.1 |
| 7,046,978 | B2* | 5/2006 | Burke et al. | 455/272 |
| 7,065,369 | B2* | 6/2006 | Tang et al. | 455/456.1 |
| 7,123,928 | B2* | 10/2006 | Moeglein et al. | 455/456.3 |
| 7,133,664 | B2* | 11/2006 | Bahl et al. | 455/414.2 |
| 7,139,580 | B2* | 11/2006 | Stein et al. | 455/456.1 |
| 7,218,939 | B2* | 5/2007 | Zhengdi | 455/456.1 |
| 7,319,878 | B2* | 1/2008 | Sheynblat et al. | 455/456.3 |
| 7,400,896 | B2* | 7/2008 | Ok et al. | 455/506 |
| 7,460,505 | B2* | 12/2008 | Spain | 370/332 |
| 2001/0022558 | A1* | 9/2001 | Karr et al. | 342/450 |
| 2001/0051527 | A1* | 12/2001 | Kuwahara et al. | 455/456 |
| 2002/0025822 | A1 | 2/2002 | Hunzinger | 455/456 |
| 2002/0132625 | A1* | 9/2002 | Ogino et al. | 455/456 |
| 2003/0045303 | A1* | 3/2003 | Oda et al. | 455/456 |
| 2003/0134652 | A1* | 7/2003 | Ben-Eli | 455/515 |
| 2003/0176189 | A1* | 9/2003 | Merson et al. | 455/436 |
| 2004/0203853 | A1* | 10/2004 | Sheynblat | 455/456.1 |
| 2004/0266457 | A1* | 12/2004 | Dupray | 455/456.5 |

FOREIGN PATENT DOCUMENTS

| | | |
|---|---|---|
| WO | 9915911 | 4/1999 |
| WO | 0035208 | 6/2000 |
| WO | 0040999 | 7/2000 |

OTHER PUBLICATIONS

International Search Report—PCT/US05/035084, International Searching Authority—European Patent Office, Mar. 6, 2006.

Written Opinion—PCT/USO5/035084, International Searching Authority—European Patent Office, Mar. 6, 2006.

* cited by examiner

| TOWER SET | DELAY | TOWER SET DEF. | ... | ... | ... |
|---|---|---|---|---|---|
| TG 1 | A=2μs B=2.4μs, C=4μs | | | | |
| TG 2 | | | | | |
| TG 3 | | | | | |
| ... | | | | | |
| ... | | | | | |
| ... | | | | | |

METHOD FOR FINDING THE LOCATION OF A MOBILE TERMINAL IN A CELLULAR RADIO SYSTEM

BACKGROUND

Previous methods of achieving assisted global positioning system (A-GPS) fixes have been subject to degraded performance in networks which make use of repeaters to provide better phone service coverage in a network. Typically, in a method which uses the time difference of arrival (TDOA) to calculate the position of a mobile station (MS), the distance between a mobile station and a base transceiver station/tower (BTS) can be determined given the speed of light and the transmit/receive times of a signal transmission between the BTS and the MS. A BTS holds the radio transceivers that define a cell and coordinate the radio-link protocols with the mobile MS. A cell defines a geographic area and is usually divided into sectors. A sector references a cell which divides its coverage area into several divisions. The number of sectors supported is variable, but it's common for there to be three. However, there exist 1 and 6 sector cells and possibly even 2, 4 and 5 sector cells defined by the radio transceivers held by a BTS. Typically, at least three towers are required to determine the MS position. Multilateration is the name applied to the technique of determining position from a MS-transmitting signal to more than one receiving tower. Forward link multilateration is the name applied to the A-GPS method wherein the MS receives signals from transmitting towers to determine position. Timing is critical to either technique of multilateration as an error of a mere µs in clock synchronization (e.g., among receiving/transmitting towers) can result in an error in MS position determination of about 984 feet. Until now, other network-aided MS position determining methods roughly determined the sources of the signals received by the mobile station. Since these signal source determinations generally don't analyze a great many possible signal sources, error in source determination is likely. This error is propagated through to the determination of the location of the mobile station in that error in the identification of the sources of the signals likely leads to an error in determining the location of the mobile station.

BRIEF DESCRIPTION OF THE DRAWINGS

FIG. 2 is a chart illustrating useful information to be held in an almanac holding delay data for sets of base station transceiver stations.

Figure 1:
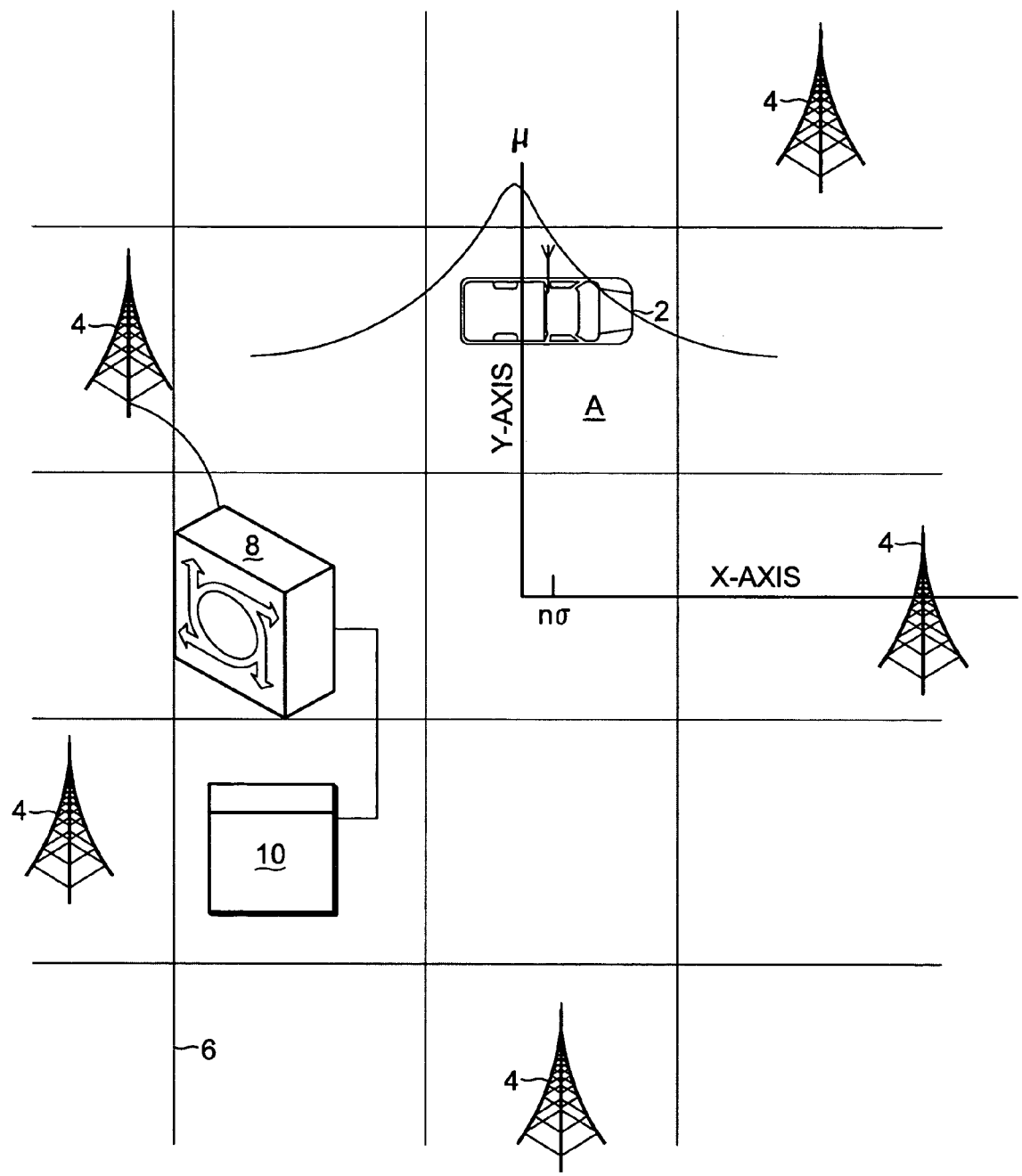
FIG. 1 is a diagram illustrating a mobile station, e.g., mobile phone or other personal communications device, and a number of base station transceiver stations/towers within a grid area.

Reference numerals have been carried forward.

DETAILED DESCRIPTION

A system, a method, and a device for determining the position of a mobile station are provided using network assisted multilateration methodology. According to one embodiment, an almanac is prepared which contains distance range information from base station transceiver stations (cell towers) within an area mapped according to an organizational structure such as a grid. Note that "grid" as used herein need not have portions which are rectangular or even uniform in extent. The distance range information is stored in the almanac in the form of signal delay data. The signal delay to be measured can be that of a pilot signal. This is particularly useful for code division multiple access (CDMA) systems. For instance, in a CDMA system, each base station transceiver (BTS), i.e. base station or cell site, transmits a pseudo noise (PN) code having a unique code sequence which a mobile device, such as a mobile phone, can distinguish in the BTS's pilot signal on the forward link (communication from a BTS to a mobile station) pilot channel. The pilot signal is constantly transmitted on the pilot channel in order for the mobile device to acquire the system.

Note that the range of a transmitting source to a receiver can be determined from the signal delay manifested by the phase of the signal at the receiver.

FIG. 1 is a diagram illustrating mobile station 2, (e.g., mobile phone, personal digital assistant with wireless communications capability, portable computer with wireless communications capability, pager or other personal communications device) and a number of base station transceiver stations/towers 4 within grid area 6. In one aspect of the invention, mobile station 2 receives signals from a multiple number of sources including towers 4. A hypothesis test is made: namely, signals received by mobile station 2 came from a given set of towers, e.g. three towers.

Given that a phase difference will exist between the signal transmissions from separate locations unequally distanced from a receiver and that multi-path signals resulting from reflections and deflections off of structures such as buildings, etc. can be distinguished from direct transmissions from towers 4, signal delay calculations from the hypothesized set of towers, based off of signal phase differences, can be determined at mobile station 2 or the appropriate data can be forwarded from the mobile station to communications network computer 8 for remote computation.

After computation of signal delays of signal transmissions from the hypothesized set of towers is determined, this data is transmitted to communications network computer 8, which serves as a comparator for comparison with signal delay data from collections of three transmitting towers found in almanac 10. More specifically, a comparison is made between the actual delays from the signal readings with the delays listed in almanac 10 for collections of sets of transmitting towers. All combinations of towers, within one or more networks, of a specified set size can be used in connection with determining signal delay data to fill almanac 10.

Almanac 10 data can be arrived at preferably by calculation based upon known BTS locations. Alternatively, although less desirably than calculation, this data can be collected by measurement over an area. In this regard, a vehicle equipped with signal monitoring gear provides almanac data in connection with conducting a survey of signal data including signal delay information from BTSs over an area, identifying BTSs via a pilot signal signature.

FIG. 2 is a chart illustrating useful information to be held in almanac 10 of FIG. 1. Almanac 10 may list the tower set, its definition, and the reception delay associated with each member of the tower set. For instance, as shown in FIG. 2, the tower set TG1 may be defined as towers A, B and C. The delays associated with each tower in the group are noted. Consequently, a 2 µs delay is shown for tower A, a 2.4 µs delay is shown for tower B and a 4 µs delay is shown for tower C.

The comparison of measured data and almanac data is manifested through the determination of the correlation between the measured data and almanac data. The correlation between measured data and almanac data is determined in connection with assigning a probability score to a broadcast from each (or most likely combination) set of towers and the corresponding actual signal delays measured based on the hypothesis test. All towers and combinations of towers need not be considered in the comparison of almanac and actual delay data. Selection of towers to be considered in the comparison can result from consideration of the strength of the pilot signal emanating from a BTS, etc. For instance, only sets of BTS sites having at least one BTS site in the set with a pilot signal strength above a specified threshold level need be considered in the comparison.

The probability score can be assigned by network computer 8 of FIG. 1. The signal delays will be made apparent by a phase difference between pseudo-random noise code sequences being received by the mobile station from the transmitting towers. It can reasonably be assumed that the probability score can be determined using a Gaussian distribution, since according to the Central Limit Theorem, a large group of independent errors give a total error that is Gaussian. The probability score can be based on the number of standard deviations away from a mean. Note that should the actual delays of the signals exactly match the hypothetical delays associated with a set of transmitting towers, the probability score for this set of transmitting towers is 1. Consequently, with great confidence, it can be said that the particular set of transmitting towers are the ones to use in determining the position of the mobile station in connection with using a multilateration method. A Gaussian distribution curve is superimposed on the diagram of FIG. 1. The position of mobile station 2 at $n\sigma$ along the abscissa axis could, for instance, signify the correlation of the collected data from the almanac data. Note that the network computer making the signal delay determinations for received signals need not be the same computer performing the almanac comparison. The probability scores can be stored in a database, preferably a temporary database, for selection of the probability score of greatest correlation to almanac data representative of a set of base stations, by a device which functionally serves as a selector. Once again, computer 8 of FIG. 1 can carry out the selector functionality.

Once the probability score of greatest correlation is selected, i.e., selecting the most probable set of transmitting towers, the position of the mobile station is determined using multilateration assuming broadcast in the vicinity of the set of most probable towers using a method of TDOA from the set of most probable towers. In the case of probability score ties, the position determination process is restarted, beginning with the collection of signal delay data by the mobile station. This process is repeated until a single probability score emerges representative of a single set of towers of greatest correlation to the collected data. The position of the mobile station, in one aspect of the invention, is preferably indicated in terms of longitude and latitude readings. However, these readings can be further mapped to a point on a street map, atlas, etc. The foregoing method pertains to forward link multilateration since the mobile station 2 receives the signals transmitted from towers 4 in connection with making position determinations.

Figure 3:
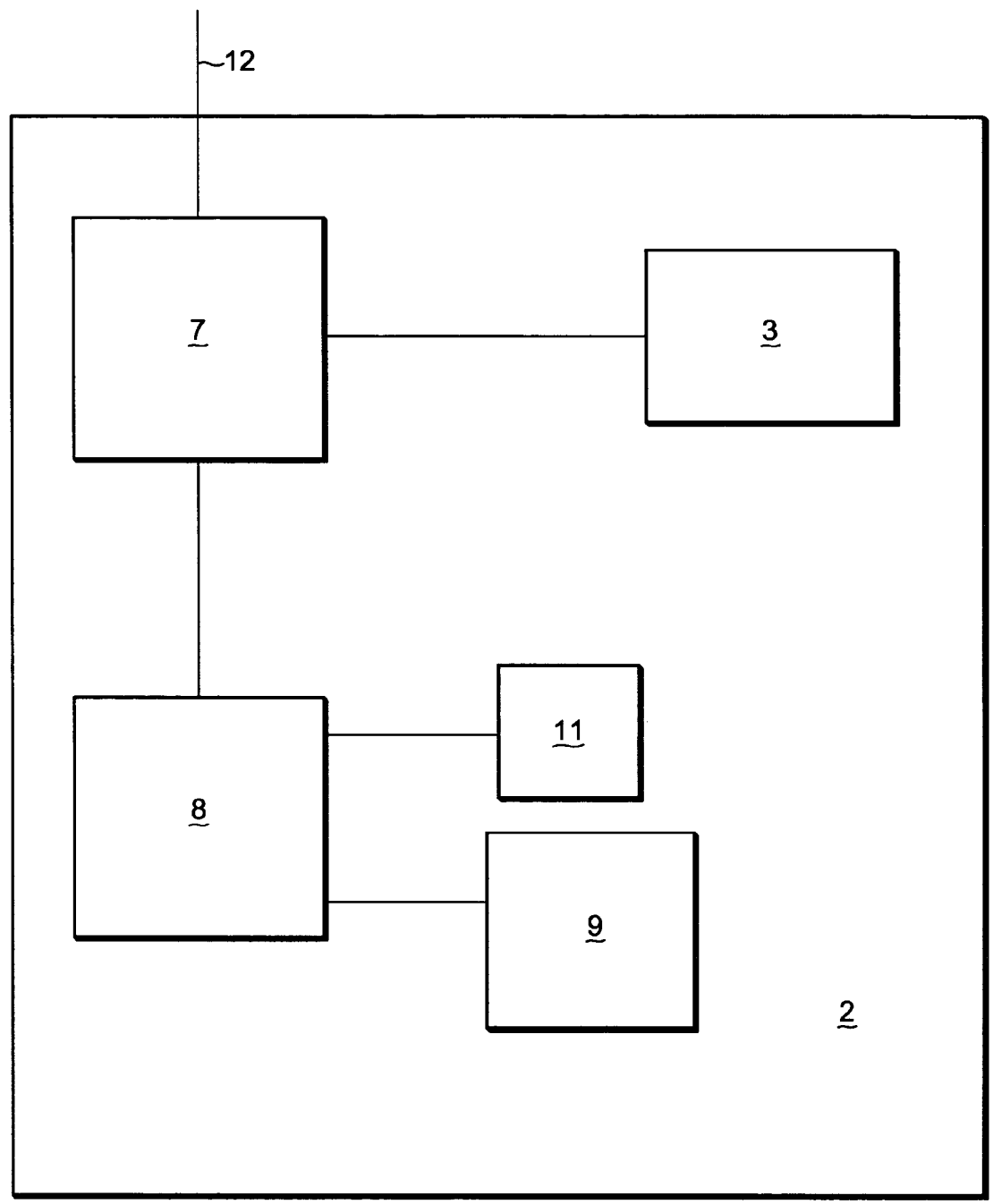
FIG. 3 illustrates a block diagram layout of a mobile station.

FIG. 3 illustrates a block diagram layout of mobile station 2 which includes display 3 connected to radio frequency (RF) section 7 and processor 8. Signal delay calculations can be performed within processor 8 in connection with running software 9 capable of making signal delay calculations. RF section 7 provides the communication link through antenna 12 to the communications network. Results of a position determination can be shown on display 3 in the form of latitude and longitude readings. Additionally, processor 8 through memory 11 can provide mapping of latitude and longitude readings to mapped locations (street map, atlas, etc.) for indication on display 3.

Figure 4:
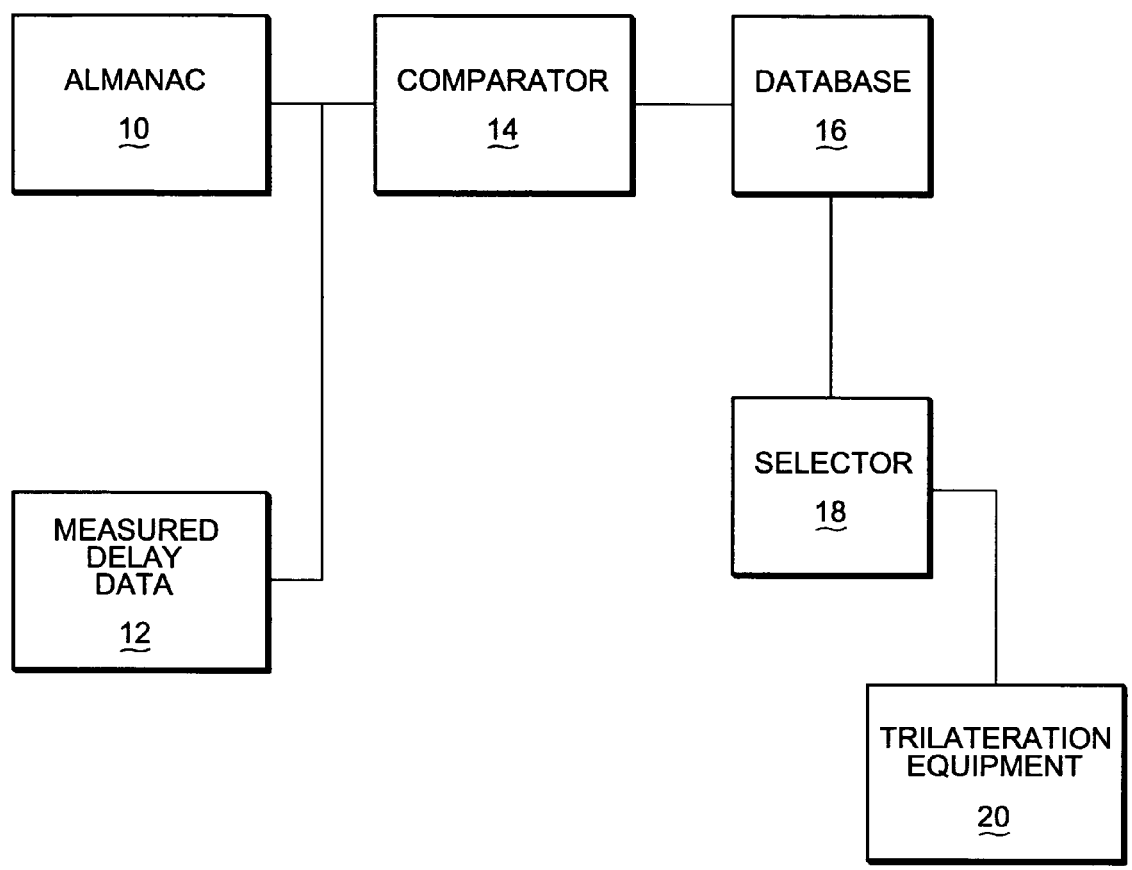
FIG. 4 illustrates a block diagram of a system according to one aspect of a preferred embodiment of the invention.

FIG. 4 illustrates a block diagram of a system according to one aspect of a preferred embodiment of the invention. As shown, almanac 10 data, containing sets of signal delay information for sets of BTSs, is compared with measured delay data 12 by comparator 14. The comparisons performed by comparator 14 are stored in database 16 in the form of a probability score. Selector 18 selects a set of BTSs by identifying the best score corresponding to the set of BTSs which represent the nearest set of BTS transmission sources to a mobile station (not shown). Multilateration equipment 20 fixes the position of the mobile station based on set of BTSs selected by selector 18. The fixes determined by multilateration equipment 20 can be forward to the mobile station or to other locations, e.g., 911 dispatcher, fleet dispatcher, etc.

Figure 5:
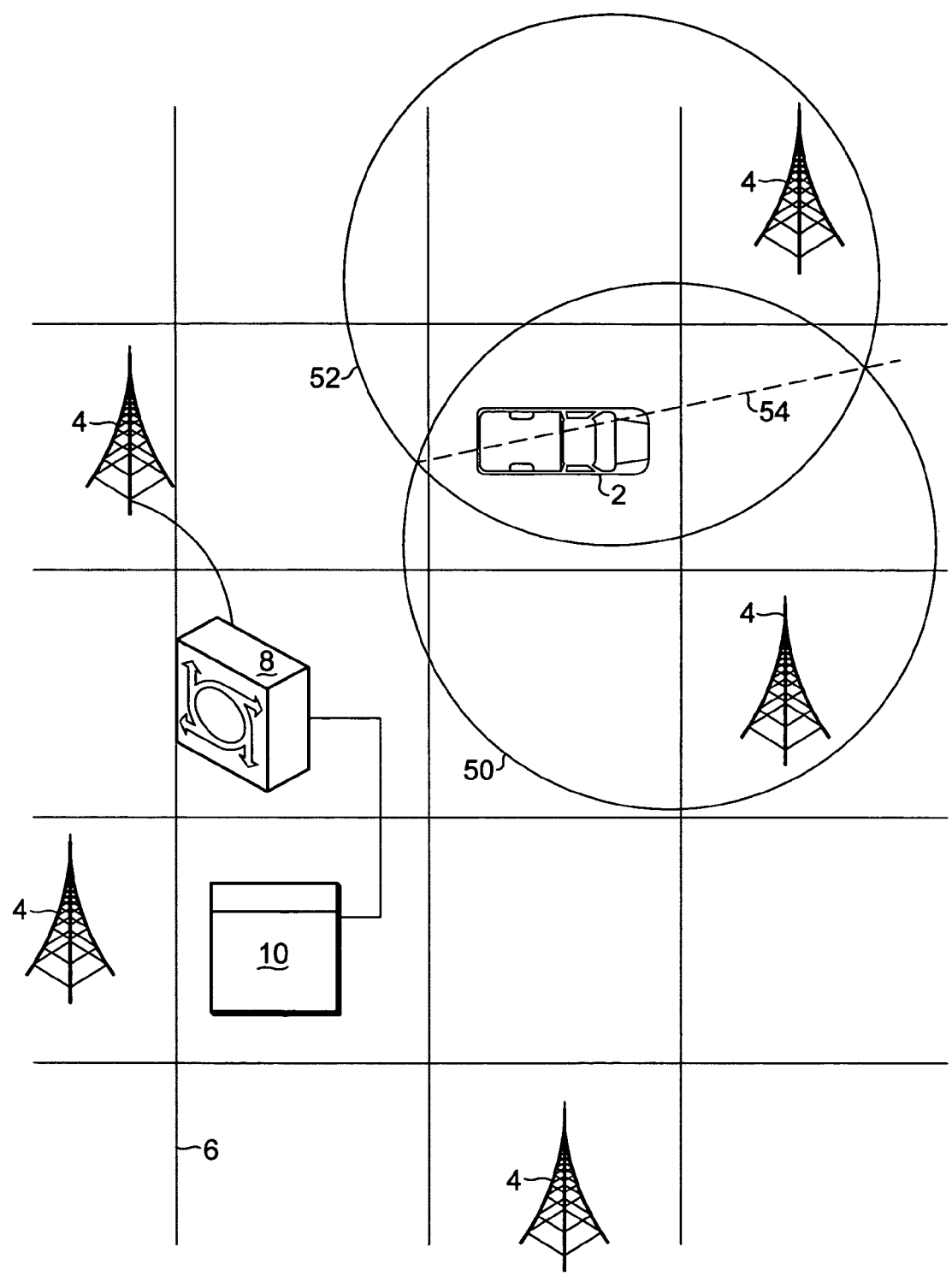
FIG. 5 is a diagram illustrating a mobile station, e.g., mobile phone or other personal communications device, and a number of base station transceiver stations/towers within a grid area.

In another preferred embodiment, a mobile station position fix can be estimated using less than three BTSs. When three or more towers are used to fix the position of the mobile station, the system is said to be overdetermined. Consequently, it is possible to obtain a more accurate position determination solution as greater transmit ranges are ascribed to more towers. This permits a better determination of a mobile station position fix and a better determination of which towers are the most likely source of signals to mobile station 2. However, two BTSs can used to obtain a fix of the relative range between each of the two BTSs and the mobile station. With reference to FIG. 5, which is a diagram illustrating mobile station 2 and a number of base station transceiver stations/towers 4 within grid area 6, two towers 4 are chosen as the source of signals to mobile station. These towers have been circumscribed by circles 50 and 52 which are indicative of the tower coverage area according to a given tower transmit range constraint. Almanac 10 of FIG. 2 can comprise information pertaining to a tower set defined by pairs of BTSs. Signal delay information contained within almanac 10 for each tower set is compared with measured delay data received by mobile station 2. The comparisons are transformed into a probability score which tracks the correlation of the measured signal delay with the delay found in almanac 10. A set of BTSs is identified with the best score corresponding to the set of BTSs which represent the nearest set of BTS transmission sources to a mobile station. Knowing the coverage area of BTSs, a most likely mobile station position can be picked along a line 54 defined by the two intersecting points of circles 50 and 52 within the given tower transmit range constraint.

In any of the foregoing embodiments of the invention, historical positioning data may be taken into account in determining position. Should mobile station 2 have its position indicated at point A in grid area 6, then in connection with a predetermined amount of time which has elapsed since the previous position determination, the probability score for towers in the vicinity of the previous position is more heavily weighted. This occurs because, depending upon the mode of transportation, e.g., motor vehicle, foot, etc., changes in position may be limited. Optionally, the weighting may depend specifically on the mode of transportation used in connection with the mobile station. For instance, if the mode of transportation the rate of change of position will likely be much greater than that associated with a mode of transportation by foot.

Although the invention herein has been described with reference to particular embodiments, it is to be understood that these embodiments are merely illustrative of the principles and applications of the present invention. For instance, the foregoing invention can be implemented in not only CDMA systems but also in time division multiple access (TDMA) systems or frequency division multiple access systems (FDMA) or space division multiple access (SDMA) systems. It is therefore to be understood that numerous modifications may be made to the illustrative embodiments and that other arrangements may be devised without departing from the spirit and scope of the present invention as defined by the appended claims.

The invention claimed is:

1. A system for determining the position of a mobile station comprising:
   an almanac including signal delay transmission data information for a mapped area from a set of base stations to selected locations on said mapped area;
   A comparator operable to compare almanac data for selected sets of base stations with measured signal data collected by said mobile station, said comparator being further operable to assign a probability score to each selected set of base stations corresponding to said measured signal data, wherein the probability score is determined using a Gaussian distribution;
   a tower set selector operable to select a set of base stations from the selected sets of base stations most indicative of signals to said mobile station based on said probability score; and
   Multilateration equipment operable to obtain a position fix for said mobile station based upon the base stations selected by said tower set selector and measured signal delay data collected by said mobile station for the selected set of base stations.

2. A system for determining the position of a mobile station as recited in claim 1 wherein said system provides radio-channel access through a technique selected from the group of radio-channel access schemes consisting of CDMA, TDMA, FDMA and SDMA or a combination thereof.

3. A system for determining the position of a mobile station as recited in claim 1 wherein each set of base stations comprises three base stations.

4. A system for determining the position of a mobile station as recited in claim 1 wherein. each. set of base stations comprises two base stations.

5. A system as recited in claim 1 wherein said almanac signal delay transmission data information is generated based upon the known locations of BTS sites.

6. A system. as recited in claim 1 wherein said almanac signal delay transmission data information results from measurements made in connection with a survey of signal data over an area.

7. A system as recited in claim 1 wherein said comparator is a communications network computer.

8. A system as recited in claim 1 wherein said selected sets of base stations are chosen on the basis of base station pilot signal strength.

9. A system as recited in claim 1 wherein said probability score is defined in terms of a standard deviation from a mean in connection with a Gaussian distribution.

10. A system as recited in claim 1 which further includes a database for storage of said probability scores.

11. A system as recited in claim 1 wherein said mobile station is a mobile communications device selected from the group consisting of a mobile phone, a personal digital assistant with wireless communications capability, a portable computer with wireless communications capability and a pager.

12. A method of determining the position of a mobile station comprising:
   Collecting signal delay data from a location in the vicinity of said mobile station;
   comparing said collected signal delay data with selected almanac signal delay data from an almanac, said almanac signal delay data representing signal delay information pertaining to predetermined sets of base station sites;
   assigning a probability score to said selected almanac signal delay data based on statistical correlation between said collected data and said selected almanac signal delay data, wherein the probability score is determined using a Gaussian distribution;
   selecting one of said predetermined set of base stations with a probability score indicative of greatest correlation to said collected data;
   Locating the position of said mobile station according to a technique of multilateration using transmitting base station data from said one of said predetermined set of base stations and collected signal delay data for the selected set of base stations.

13. A method of determining the positron of a mobile station, as recited in claim 12 wherein said almanac data is generated based upon the known locations of BTS sites.

14. A method of determining the position of a mobile station as recited in claim 13 wherein said almanac data results from measurements in connection with a survey of signal data over an area.

15. A method of determining the position of a mobile station as recited in claim 13 wherein each predetermined set of base station sites comprises three base station sites.

16. A method of determining the position of a mobile station as recited in claim 12 wherein said predetermined sets of base stations are chosen on the basis of base station pilot signal strength.

17. A method as recited in claim 12 wherein said mobile station is a mobile communications device selected from the group consisting of a mobile phone, a personal digital assistant with wireless communications capability, a portable computer with wireless communications capability and a pager.

18. A mobile station comprising:
   a display;
   an antenna;
   a radio frequency section for providing a communications link to a communications network through said antenna; and
   a processor programmed for making signal delay calculations in connection with data received from said communications network and for providing a readout on said display that includes a position of the mobile station that is determined according to a technique of multilateration using signal delay data for a set of base stations selected from a plurality of sets of base stations based on a probability score that indicates the signal delay data corresponds to the selected set of base stations, wherein the probability score is determined using a Gaussian distribution.

19. A mobile station as netted in claim 18 wherein said mobile station is a mobile communications device selected from the group consisting of a mobile phone, a personal digital assistant with wireless communications capability, a portable computer with wireless communications capability and a pager.

20. An apparatus of determining the position of a mobile station comprising:
  Means for collecting signal delay data from a location in the vicinity of said mobile station;
  Means for comparing said collected signal delay data with selected almanac signal delay data from an almanac, said almanac signal delay data representing signal delay information pertaining to predetermined sets of base station sites;
  Means for assigning a probability score to said selected almanac signal delay data based on statistical correlation between said collected data and said selected almanac signal delay data, wherein the probability score is determined using a Gaussian distribution;
  Means for selecting one of said predetermined set of base stations with a probability score indicative of greatest correlation to said collected data;
  Means for locating the position of said mobile station according to a technique of multilateration using transmitting base station data from said one of said predetermined set of base stations and collected signal delay data for the selected set of base stations.

21. An apparatus as recited in claim 20, wherein said predetermined sets of base stations are chosen on the basis of base station pilot signal strength.

22. An apparatus as recited in claim 20, wherein said probability score is defined in terms of a standard deviation from a mean in connection with a Gaussian distribution.

* * * * *